US010579709B2

(12) United States Patent
Raghunathan et al.

(10) Patent No.: US 10,579,709 B2
(45) Date of Patent: Mar. 3, 2020

(54) PROMOTING CONTENT

(71) Applicant: Google LLC, Mountain View, CA (US)

(72) Inventors: Vivek Raghunathan, Fremont, CA (US); David G. Arthur, Mountain View, CA (US); Rohan Jain, New York, NY (US); Emily Kay Moxley, San Francisco, CA (US); Shivakumar Venkataraman, Santa Clara, CA (US); Nipun Kwatra, Bangalore (IN); Brett A. McLarnon, Mountain View, CA (US); David J. Ganzhorn, Mountain View, CA (US)

(73) Assignee: Google LLC, Mountain View, CA (US)

( * ) Notice: Subject to any disclaimer, the term of this patent is extended or adjusted under 35 U.S.C. 154(b) by 64 days.

(21) Appl. No.: 16/102,330

(22) Filed: Aug. 13, 2018

(65) Prior Publication Data
US 2018/0349330 A1   Dec. 6, 2018

Related U.S. Application Data

(63) Continuation of application No. 15/090,166, filed on Apr. 4, 2016, now Pat. No. 10,061,751, which is a (Continued)

(51) Int. Cl.
*G06F 17/21*     (2006.01)
*G06F 17/27*     (2006.01)
(Continued)

(52) U.S. Cl.
CPC .......... *G06F 17/212* (2013.01); *G06F 16/972* (2019.01); *G06F 17/227* (2013.01); *G06F 17/27* (2013.01); *G06Q 30/0241* (2013.01)

(58) Field of Classification Search
CPC ....................................................... G06F 17/27
(Continued)

(56) References Cited

U.S. PATENT DOCUMENTS 4,841,472 A * 6/1989 Izuhara ............... G06F 17/2745
704/1
5,878,385 A   3/1999 Bralich et al.
(Continued)

FOREIGN PATENT DOCUMENTS

EP    0287858    10/1988
EP    1143340    10/2001
(Continued)

OTHER PUBLICATIONS

Lyons, Ken Keyword Optimization. Why Optimizing for the Right Keywords is Do or Die, Apr. 14, 2010, downloaded Nov. 16, 2013 from http://www.wordstream.com/blogs/ws/2010/04/14/keyword-optimization, 5 pages.

*Primary Examiner* — Daniel C Washburn
*Assistant Examiner* — Timothy Nguyen
(74) *Attorney, Agent, or Firm* — Fish & Richardson P.C.

(57) ABSTRACT

Methods, systems, and apparatus, including computer programs encoded on a computer-readable storage medium, and including a computer-implemented method for providing creatives. The method comprises identifying, using one or more processors, a creative for processing, the creative including a title portion and a body portion, where the body portion includes a visual uniform resource locator (URL), the visual URL comprising a visual portion and a link to a resource. The method further comprises evaluating the visual URL for inclusion in the title portion, including determining when promotion of the visual URL satisfies one or more promotion criterion, and if so, promoting the visual URL for inclusion in the title portion. The method further (Continued)

comprises providing the creative including the title portion with the promoted visual URL.

20 Claims, 6 Drawing Sheets

Related U.S. Application Data continuation of application No. 13/471,991, filed on May 15, 2012, now Pat. No. 9,304,985, which is a continuation-in-part of application No. 13/410,921, filed on Mar. 2, 2012, now Pat. No. 9,471,551.

(60) Provisional application No. 61/594,907, filed on Feb. 3, 2012.

(51) Int. Cl.
 G06F 17/22 (2006.01)
 G06F 16/958 (2019.01)
 G06Q 30/02 (2012.01)

(58) Field of Classification Search
 USPC ......................................................... 704/244
 See application file for complete search history.

(56) References Cited

U.S. PATENT DOCUMENTS

| | | |
|---|---|---|
| 6,341,306 B1 | 1/2002 | Rosenschein et al. |
| 7,363,302 B2 | 4/2008 | Lester |
| 7,467,087 B1 | 12/2008 | Gillick |
| 7,587,309 B1 | 9/2009 | Rohrs et al. |
| 7,707,226 B1 | 4/2010 | Tonse |
| 7,734,722 B2 | 6/2010 | Seidl et al. |
| 7,813,959 B2 | 10/2010 | Sobotka et al. |
| 7,831,585 B2 | 11/2010 | Ramsey |
| 8,041,601 B2 | 10/2011 | Fikes et al. |
| 8,117,069 B2 | 2/2012 | Law et al. |
| 8,214,261 B2 | 7/2012 | Chen et al. |
| 8,335,719 B1 | 12/2012 | Quraishi et al. |
| 8,386,509 B1 | 2/2013 | Scofield et al. |
| 8,712,850 B1 | 4/2014 | Raghunathan et al. |
| 8,738,557 B1 | 5/2014 | Grundman et al. |
| 8,972,413 B2 | 3/2015 | Lee et al. |
| 2002/0194066 A1 | 12/2002 | Shultz |
| 2003/0149937 A1 | 8/2003 | McElfresh et al. |
| 2004/0260689 A1 | 12/2004 | Colace |
| 2004/0267806 A1 | 12/2004 | Lester |
| 2005/0080631 A1 | 4/2005 | Abe |
| 2005/0203918 A1 | 9/2005 | Holbrook |
| 2005/0204384 A1 | 9/2005 | Yuen et al. |
| 2006/0031187 A1 | 2/2006 | Pyrce et al. |
| 2006/0149623 A1 | 7/2006 | Badros |
| 2007/0011142 A1 | 1/2007 | Sattler et al. |
| 2007/0061335 A1 | 3/2007 | Ramer et al. |
| 2007/0239530 A1 | 10/2007 | Datar |
| 2007/0288431 A1 | 12/2007 | Reitter et al. |
| 2007/0288514 A1 | 12/2007 | Reitter et al. |
| 2008/0052161 A1 | 2/2008 | Cohen et al. |
| 2008/0152300 A1 | 6/2008 | Knee et al. |
| 2008/0168135 A1 | 7/2008 | Redlich et al. |
| 2008/0189110 A1 | 8/2008 | Freeman et al. |
| 2008/0288325 A1 | 11/2008 | Pavlov |
| 2008/0313030 A1 | 12/2008 | Makeev et al. |
| 2008/0319944 A1 | 12/2008 | Venolia et al. |
| 2009/0006358 A1 | 1/2009 | Morris et al. |
| 2009/0006389 A1 | 1/2009 | Piscitello et al. |
| 2009/0055266 A1 | 2/2009 | Brody et al. |
| 2009/0077071 A1 | 3/2009 | Mishkanian et al. |
| 2009/0112840 A1 | 4/2009 | Murdock et al. |
| 2009/0112844 A1 | 4/2009 | Oro |
| 2009/0144141 A1 | 6/2009 | Dominowska et al. |
| 2009/0197580 A1 | 8/2009 | Gupta et al. |
| 2009/0240674 A1 | 9/2009 | Wilde et al. |
| 2009/0254549 A1 | 10/2009 | Epstein |
| 2009/0265243 A1 | 10/2009 | Karassner et al. |
| 2009/0287672 A1 | 11/2009 | Chakrabarti et al. |
| 2009/0300139 A1 | 12/2009 | Shoemaker et al. |
| 2010/0036726 A1 | 2/2010 | Gallet |
| 2010/0049709 A1 | 2/2010 | Ravikumar et al. |
| 2010/0131384 A1 | 5/2010 | Chen et al. |
| 2010/0211431 A1 | 8/2010 | Lutnick et al. |
| 2010/0228622 A1 | 9/2010 | Vijayakrishnan |
| 2010/0231523 A1* | 9/2010 | Chou .................... G06F 3/018 345/171 |
| 2010/0241507 A1 | 9/2010 | Quinn et al. |
| 2010/0324993 A1 | 12/2010 | Kacholia et al. |
| 2011/0035276 A1 | 2/2011 | Ghosh et al. |
| 2011/0125575 A1 | 5/2011 | Lasker et al. |
| 2011/0170788 A1 | 7/2011 | Nepomniachtchi |
| 2011/0196746 A1 | 8/2011 | Tang et al. |
| 2011/0208581 A1 | 8/2011 | Roebuck |
| 2011/0225037 A1 | 9/2011 | Tunca et al. |
| 2011/0295605 A1 | 12/2011 | Lin |
| 2012/0078711 A1 | 3/2012 | Mehta et al. |
| 2012/0158494 A1 | 6/2012 | Reis et al. |
| 2012/0166413 A1 | 6/2012 | LeBaron |
| 2012/0215627 A1 | 8/2012 | Lee et al. |
| 2012/0253927 A1 | 10/2012 | Qin et al. |
| 2012/0290433 A1 | 11/2012 | England et al. |
| 2013/0073398 A1 | 3/2013 | Levy et al. |
| 2013/0124984 A1 | 5/2013 | Kuspa |
| 2013/0159092 A1 | 6/2013 | Lahaie et al. |
| 2014/0006972 A1* | 1/2014 | Celkonas ............ G06Q 10/101 715/753 |
| 2014/0142953 A1 | 5/2014 | Kim |
| 2014/0195332 A1 | 7/2014 | Grauer et al. |
| 2019/0108183 A1* | 4/2019 | Fatourechi .......... G06F 17/3082 |

FOREIGN PATENT DOCUMENTS

| | | |
|---|---|---|
| WO | WO 2001/016683 | 3/2001 |
| WO | WO 2001/016694 | 3/2001 |
| WO | WO 2005/006282 | 1/2005 |
| WO | WO 2008/144772 | 11/2008 |
| WO | WO 2010/054201 | 5/2010 |
| WO | WO 2010/104914 | 9/2010 |

* cited by examiner

320

Identify a creative for processing that includes a title portion and a body portion, where the body portion includes a visual uniform resource locator (URL) that has a visual portion and includes a link to a resource  322

Evaluate the body portion including determining when a textual portion of the body portion includes a complete phrase, the evaluating including applying a test to one or more words in the body portion  324

Complete phrase located? 326 — Yes → Promote the complete phrase into the title portion  328

No

Evaluate the visual URL for inclusion in the title portion including determining when promotion of the visual URL satisfies one or more promotion criterion  330

Visual URL satisfies one or more promotion criterion 332 — Yes → Promote the visual URL for inclusion in the title portion  334

No

Provide the creative including the title portion with the promoted complete phrase or visual URL  336

FIG. 3B

PROMOTING CONTENT

CROSS-REFERENCE TO RELATED APPLICATIONS

This application is a continuation of U.S. application Ser. No. 15/090,166, filed on Apr. 4, 2016, which is a continuation of U.S. application Ser. No. 13/471,991, filed on May 15, 2012, which is a continuation-in-part of U.S. application Ser. No. 13/410,921, filed on Mar. 2, 2012, and claims priority to U.S. Provisional Application No. 61/594,907, filed on Feb. 3, 2012. The disclosures of the prior applications are considered part of and are incorporated by reference in the disclosure of this application.

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Content item slots can be allocated to content sponsors as part of a reservation system, or in an auction. For example, content sponsors can provide bids specifying amounts that the sponsors are respectively willing to pay for presentation of their content. In turn, an auction can be run, and the slots can be allocated to sponsors according, among other things, to their bids and/or the relevance of the sponsored content to content presented on a page hosting the slot or to a request that is received for the sponsored content. The content can then be provided to the user on any devices associated with the user such as a personal computer (PC), a smartphone, a laptop computer, a tablet computer, or some other user device. One type of content provided can be a textual advertisement that includes a title portion and one or more lines of text in a body portion, which can include a visual URL (uniform resource link).

SUMMARY

In general, one innovative aspect of the subject matter described in this specification can be implemented in methods that include a computer-implemented method for providing creatives. The method comprises identifying, using one or more processors, a creative for processing, the creative including a title portion and a body portion, where the body portion includes a visual uniform resource locator (URL), the visual URL comprising a visual portion and a link to a resource. The method further comprises evaluating the visual URL for inclusion in the title portion, including determining when promotion of the visual URL satisfies one or more promotion criterion, and if so, promoting the visual URL for inclusion in the title portion. The method further comprises providing the creative including the title portion with the promoted visual URL.

These and other implementations can each optionally include one or more of the following features. The method can further comprise reducing a link associated with the visual URL to a simple domain, where providing the creative including the promoted visual URL includes providing a visual URL having an associated link to the simple domain. Providing the visual URL can include providing a modified version of the visual URL that is directed to the simple domain. Providing the modified version can include removing a domain reference from the visual URL prior to promotion. The domain reference can be of the form of a ".X" reference, where X refers to a top-level domain. Promoting can comprise emphasizing text associated with the visual URL including emphasizing by using all uppercase characters or all lowercase characters or capitalizing one or more individual words in the visual URL. One of the one or more promotion criterion can include display criteria related to a size of the visual URL and available promotion space in the title portion. Evaluating the visual URL can include determining when, if promoted, the visual URL would violate one or more predetermined restrictions on promotion and not promoting the visual URL if a violation would occur. One predetermined restriction can relate to a length of the title portion. One predetermined restriction can relate to content that can be included in the title portion. One predetermined restriction can relate to redundant content, and the method can further comprise determining when the title portion includes one or more words included in the visual URL and not promoting the visual URL when redundancy is found. The method can further comprise determining when the redundancy is partial redundancy and promoting the visual URL when partial redundancy is determined. One predetermined restriction can relate to policy restrictions. The method can further comprise determining when promotion should occur including evaluating one or more metrics associated with the creative or delivery of the creative. One metric can relate to a location of where the creative is to be served. One metric can relate to a user to whom the creative is to be displayed. One metric can relate to an environment associated with the serving of the creative. One metric can relate to a relative projected performance of the creative with and without content added to the title portion. Providing the creative can include providing estimated performance information for the creative. Providing the estimated performance information for the creative can include providing a relative performance change projection. The method can further include determining a location of where the creative is to be served to a user, and promoting unless the location is on a predetermined list of locations where promotion is not desirable. The method can further comprise receiving a request for content, and providing the creative responsive to the request. The body portion can include one to three lines of text. Promoting the visual URL can include appending the visual URL to the end of the title portion. Promoting the visual URL can further include adding a delimiter to the title portion between text of the title portion and the promoted visual URL. The delimiter can separate the text of the title portion from the promoted visual URL. Promoting the visual URL can include constructing a reference for the title portion after promotion. The reference can be directed to a first resource. The link can be directed to a second different resource. Providing the creative can include storing the creative. Providing the creative can include providing the creative responsive to a received request for a creative to fill a slot.

In general, another innovative aspect of the subject matter described in this specification can be implemented in methods that include another computer-implemented method for providing creatives. The method comprises identifying, using one or more processors, a creative for processing, the creative including a title portion and a body portion, where the body portion includes a visual uniform resource locator (URL), the visual URL having a visual portion and including a link to a resource. The method further comprises evaluating the body portion including determining when a textual portion of the body portion includes a complete phrase, the evaluating including applying a test to one or more words in the body portion. The method further comprises promoting, using the one or more processors, the complete phrase into the title portion. The method further comprises, when a complete phrase is not located or after the complete phrase has been promoted, evaluating the visual URL for inclusion in the title portion including determining when promotion of the visual URL satisfies one or more promotion criterion, and when so, promoting the visual URL for inclusion in the title portion. The method further comprises providing the creative including the title portion with the promoted complete phrase and/or visual URL.

Particular implementations may realize none, one or more of the following advantages. For example, promoting content from a body portion to a title portion can increase interaction rates for content, including click-through rates. For example, a sentence or a visual URL that is promoted to the first line of the creative may entice the user to click on the creative, e.g., to obtain more information or to make a purchase. In some implementations, promotion of content can improve the quality of a creative by identifying and promoting a sentence that might otherwise appear to the user as disjoint information. For example, the user may be able to read a sentence or a complete thought where none was obvious before. In some implementations, promotion of a visual URL (or a reduced version thereof) can entice the user to interact with a presented content item (e.g., select a corresponding link or to navigate to a landing page or some other Web location associated with the content item). In some implementations, promotion of content can also include the removal of redundant information, which can provide a creative that is more compact and free of repeated keywords or other extraneous information.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3B is a flowchart of an example process for determining whether to promote a complete phrase or a visual URL in a creative.

Like reference numbers and designations in the various drawings indicate like elements.

DETAILED DESCRIPTION

Figure 1:
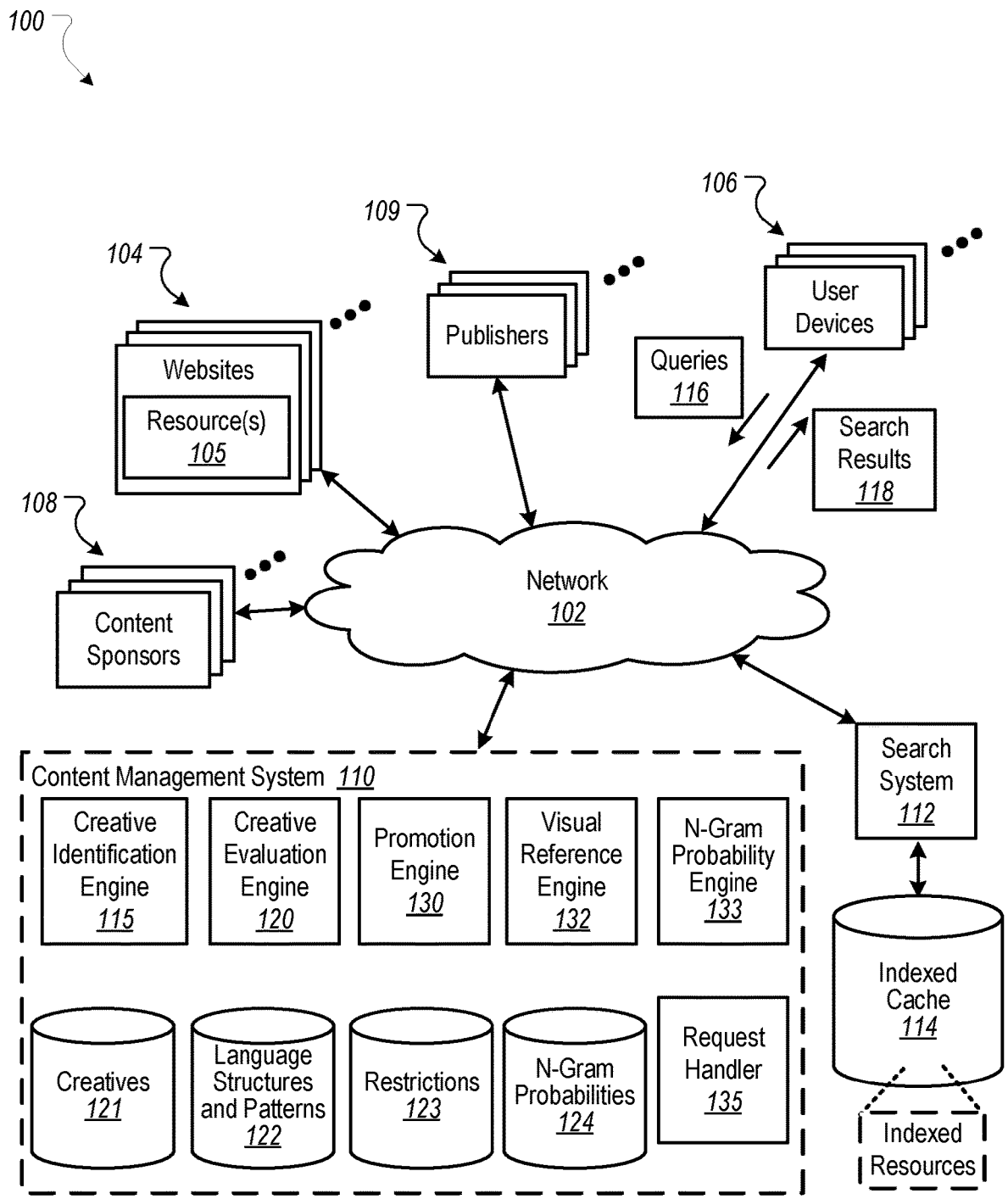
FIG. 1 is a block diagram of an example environment for delivering content.

This document describes methods, apparatuses and systems for promoting information in a content item to a different (e.g., higher or more prominent) location within the content item. A content item can be of the form of an advertisement. While reference is made to an advertisement, other forms of sponsored content are possible. A content item includes criteria (i.e., specifying when the content item is shown) and a creative (i.e., what is shown). As used here, content refers to subject matter that is requested by a user/device and delivered responsive to a content request. Content is also used to refer to the portion of a creative that may be promoted, e.g., to the first line of the creative. The creative can include a title portion and a body portion, e.g., including 1-3 lines. The body portion can include a visual uniform resource locator (URL) that has a visual portion (e.g., text or image content seen by the user) and includes a link to a resource. In some implementations, a decision of whether to promote the visual URL can occur either before or after decisions to promote other content, e.g., after a decision of whether to promote a complete phrase from the body portion. In some implementations, multiple content portions can be promoted.

When promoting a visual URL, for example, the entire visual URL can be promoted, or the URL can be simplified or truncated to remove all but the domain information and/or redundant information. For example, if the visual URL is www.exampleshoes.com/index/XYZ, then the promoted portion can be www.exampleshoes.com. In some implementations, the promoted portion of a visual URL can remove the reference to the World Wide Web (e.g., the "www" portion). When a visual URL or other content is promoted, the promoted content may or may not be removed from where it was promoted. For example, a shortened, modified version of a visual URL can appear in the title portion, while the visual URL in the body portion can remain unchanged (e.g., not deleted).

Another example of content that can be promoted is a group of one or more words that constitute a complete phrase (e.g., a complete sentence that ends in an end-of-line punctuation mark (or "terminator")). In another example, a complete portion of text can be promoted if it is determined that a period is missing (omitted intentionally or otherwise) from a textual portion. The determination can include evaluating probability data for N-word phrases from a corpus of creatives having (or not having) periods at given locations. Other content or portions of the creative can also be promoted. Promotion of content may be intended to occur only in specific cases, such as when the promotion is most likely to have a positive result, e.g., by improving the experience and/or likelihood of an engagement by the user to whom the content is provided.

In some implementations, creatives can include plural individual elements. For example, a creative can include a title portion and a body portion (e.g., two or more lines of text and, optionally, the visual URL). The title portion can occupy the first, top or most prominent position of the creative. The title portion can be presented in a different font, bolded, or otherwise emphasized relative to the remaining portions of the creative. In some implementations, the title portion is one line of text and is of the form of an actionable item (e.g., is a link to a landing page associated with the creative). The body portion can include, for example, plural lines of text (e.g., two) and be positioned just below the title portion. The visual URL can include a link to a resource associated with the creative (e.g., a link to a landing page associated with the creative). In some implementations, no visual URL is included in a creative. In some implementations, the visual URL occupies a third (e.g., bottom) line of the creative. While reference is made to top, middle and bottom locations above with respect to a creative, other orientations are possible for configuring the respective elements. In some implementations, other elements can be included in a creative. In some implementations, the visual URL can occupy part or all of the body portion, such as if the length of the URL is such that the URL will not fit entirely on one line.

The body portion of a creative can be evaluated, for example, to determine when the body portion includes content (e.g., one or more words) that can be added to the title portion. For example, the title portion of the creative provided by a content sponsor may initially include only the name of the product or service associated with the creative. At the same time, the body portion may include descriptive text or other information that, if promoted to the title portion, may make the creative more elicit interaction with the creative or more likely to catch the user's attention. In some implementations, the content promoted from the body portion can include words located entirely within the second line. In some implementations, promotion of content from the body portion can include content from different sections of the body portion (e.g., from the visual URL or from the rest of the body portion). In some implementations, promotion can include promotion in other locations of the creative (e.g., promotion within the body portion or promotion of content from the visual URL to another part of the body portion). After the one or more words and/or the visual URL are promoted, the creative can be provided, e.g., in response to a request for content such as a request to fill an advertisement slot on a web page.

In some implementations, creatives in which content is promoted can be provided (e.g., as suggestions) to content sponsors, e.g., in user interfaces that they use to create and/or update creatives. For example, the content sponsor may initially specify a title portion and a body portion (e.g., that contains a visual URL) as content to be included in a creative. The user interface can then display, to the content sponsor, one or more different modified versions of the creative, each version reflecting promotion of content, e.g., the visual URL to the title portion. The content sponsor can select which version(s) of the creative will be included in the campaign.

The act of promoting can, for example, move or copy content from one portion of the creative to another. For example, promoting can include moving or copying content to the title portion from other portions of the creative. In some implementations, if an entire second line of the body portion is promoted, then the original second line can be removed from the body portion. Other content can be shifted, e.g., by moving the remaining part of the body portion up a line). In another example, if a visual URL or a complete phrase is promoted that spans parts of lines two and three of the creative, then the remaining (un-promoted) portions of the body portion can be combined to create a new line that replaces the original two lines. In some implementations, content (e.g., a phone number) can be promoted by copying the information to the title portion while not removing the information from its source location.

In some implementations, promoting content can occur conditionally or only after the content is modified in some way, e.g., to remove redundant or unnecessary information. A check can be performed to determine if candidate promotion content is already included in the target location (e.g., in the original title). When promotion would result in redundant information presentation, the promotion can be blocked or candidate promotion content can be modified. This can prevent the occurrence of blank spaces, unnecessary capitalization, repeated words and/or phrases in the title portion after promotion has occurred.

In some implementations, if it is determined that the title portion includes one or more words included in the visual URL, e.g., indicating redundancy, then the visual URL may not be promoted, based on the redundancy. In some implementations, partial redundancy can be acceptable and will not restrict promotion, e.g., if the redundant content pertains to the name of a product or is other content that is considered to be acceptable or beneficial if repeated in the creative.

In some implementations, the decision of whether to promote can be based on analysis that involves N-grams, or phrases of words having different numbers of N words each. For example, if the phrase "we sell great shoes" is included in the creative, but the phrase does not end with punctuation, probability data associated with a database of creatives can be evaluated to determine a likelihood of whether a period should be inferred at the end of the text (e.g., after "shoes") or at some other position in the text. For example, the probability data can include individual probabilities that represent a likelihood that a period or other end-of-sentence punctuation mark is implied after "we," after "we sell," after "we sell great," and finally after "we sell great shoes." The probabilities can be generated based on patterns determined from other creatives that include the text "we," "we sell.", "we sell great," and "we sell great shoes."

In some implementations, the probabilities can be determined ahead of time, e.g., pre-evaluated data from a corpus of historical creatives. For example, the probabilities can represent the likelihood that a delimiter is likely to occur before or after a word in the creative. In some implementations, the probability can be based on formulas or calculations that consider the number of occurrences of a sequence of words in the corpus of creatives that include (or don't include) a delimiter in a particular position. For example, out of 30,000 creatives that include "we sell great shoes" somewhere in the creative, there may be 27,000 that include a terminator after "shoes." Further, there may be 3,000 creatives that have no terminator after "shoes" and before the next word in the creative. As a result, one example of a probability of a terminator in that position can be 90%. Using this probability, for example, it can be assumed that if the phrase "we sell great shoes" (e.g., without a terminator after "shoes") appears in a creative being evaluated for promotion, there is a very good chance that promoting the phrase to the title portion of the creative will succeed in displaying a complete phrase to the user when the advertisement is displayed.

While the example of an advertisement creative and promotion of words is used in this document, promotion can occur in other types of content items and include other types of content. For example, the other types of content that can be promoted can include content that provides a visual display to the user (e.g., an image) or content that provides some level or interactivity with the user (e.g., a link to a video, an animation, music, or some other media content). In some implementations, in addition to promotion of portions of the creative, some portions of the creative can be demoted, e.g., if they are determined to be less likely of interest to the user or for other reasons. In some implementations, additional content can be created and added to or replace existing content of a particular creative.

FIG. 1 is a block diagram of an example environment 100 for delivering content items. The example environment 100 includes a content management system 110 for selecting and providing content items in response to requests. The example environment 100 includes a network 102, such as a local area network (LAN), a wide area network (WAN), the Internet, or a combination thereof. The network 102 connects websites 104, user devices 106, content sponsors 108 (e.g., advertisers), publishers 109, and the content management system 110. The example environment 100 may include many thousands of websites 104, user devices 106, content sponsors 108 and publishers 109.

The content management system 110 can manage and provide content items, such as advertisement, or other resources. The content management system 110 and its subordinate parts can be implemented in any of several different locations and interconnected using the network 102.

In some implementations, the example environment 100 and/or the content management system 110 further includes plural engines. A creative identification engine 115 can identify a content item (e.g., an advertisement including its respective creative) for processing. A creative evaluation engine 120 can evaluate a body portion of the creative, for example, to determine when the body portion includes one or more words or other content that can be added to the title portion. A promotion engine 130 can promote the content (e.g., a complete phrase and/or a visual URL) into the title portion.

A visual URL engine 132 can be used to determine when to promote all or part of the visual URL to the title portion. For example, the visual URL engine 132 can determine if the visual URL satisfies one or more promotion criterion. In some implementations, the one or more promotion criterion can include display criteria related to a size of the visual URL, e.g., in comparison to available promotion space in the title portion. In some implementations, the visual URL engine 132 can determine when promotion of the visual URL would violate one or more predetermined restrictions on promotion, and decide not to promote the visual URL if a violation would occur. Example restrictions can relate to a length of the title portion, types of content that can be included in the title portion, and/or the existence of redundant content. In some implementations, the visual URL engine 132 can evaluate one or more metrics associated with the creative and/or its delivery to determine if promotion should occur. Example metrics can relate to a geographic location of where the creative is to be served, a particular user or demographic to whom the creative is to be displayed, an environment associated with the serving of the creative, and/or a relative projected performance of the creative with and without content added to the title portion.

The visual URL engine 132 can also be used to determine how the visual URL is promoted into the title portion. In some implementations, a link associated with the visual URL can be reduced to a simple domain, and when the creative is provided that includes the promoted visual URL, a visual URL can be provided that has an associated link to the simple domain. For example, before promotion, a modified version of the visual URL can be created that is directed to the simple domain, e.g., by removing a domain reference that is in the form of a ".X" reference (e.g., where "X" refers to a top-level domain such as .com, .org, etc.)

An N-gram probability engine 133 can determine probabilities that an end-of-sentence punctuation mark (or "terminator") is located at any of plural locations within N-word phrases that form a creative. For example, the N-gram probability engine 133 can evaluate a historical database of creatives (e.g., creatives 121) to determine the probabilities and store the probabilities (e.g., as N-gram probabilities 124) for later use in evaluating a particular creative for promotion of content. In some implementations, evaluating the body portion can include evaluating various sequences of words in the complete portion of text. For example, each sequence can be a contiguous set of words in the complete portion of text that start from a first location in the body portion. Further, each sequence can be described as including words $w_1, w_2 \ldots w_j$ having locations $0, 1, 2 \ldots j$ occurring on boundaries of the words. Evaluating can include accounting for probabilities associated with each of the sequences. For example, the creative evaluation engine 120 can use the N-gram probabilities 124 when evaluating the body portion of the creative, for example, to determine if a portion of text is to be promoted (where the promotion is, for example, a complete thought or sentence). In some implementations, the evaluation can occur when there is insufficient punctuation to determine a portion to promote, and may not need to be executed when sufficient punctuation does exist (e.g., the portion of text already ends with a period).

A redundancy engine 145 can determine redundant portions of text, e.g., to prevent the promotion of redundant content and/or to reduce the amount of redundant information in promoted content. In some implementations, the redundancy engine 145 can use information from redundancy metrics 126, e.g., including information about Boolean/binary indicators (e.g., "Is the title portion contained in the body portion?"), counts of words, stop words, word stems, penalties associated with repeated use of the same word, weights associated with the length of words, and other information, as described above.

A request handler 135 can provide the content item in response to a request for content by the user. The content item that is provided may or may not include promoted content. Other engines and other functions are possible.

In some implementations, whether or not content (e.g., one or more words) is promoted can depend, at least in part, on analyzing the creative, including performing n-gram analysis. For example, the n-gram analysis can include the use of probabilities that one-, two- and/or three-word combinations of words are likely to include an end-of-line punctuation mark and/or lead to identification of a complete concept, phrase or sentence. In some implementations, the n-gram analysis can be used to promote content that spans multiple lines (e.g., two lines in the body portion), or to recognize (e.g., using probabilities) that the inclusion (or exclusion) of an end-of-line punctuation mark does (or does not) indicate a complete concept, phrase or sentence that can be promoted. In some implementations, the n-gram analysis can include the use of scores or probability formulas that use products of probabilities that correspond to various n-grams associated with one or more words that may be promoted. In some implementations, the promotion analysis can include analysis of the words and structure of the creative, for example to determine parts of speech, capitalization and explicit and implicit punctuation. Other analysis is possible.

The environment 100 can include plural data stores. In some implementations, the data store of creatives 121 can store creatives that are provided by content sponsors 108. The creatives, for example, can be in the original form provided by the content sponsors 108, i.e., without having any of the content in the creatives promoted to other parts of the creative (e.g., the title portion). In some implementations, the creatives 121 can also store creatives in which content has been promoted (e.g., by promoting a full sentence to the title portion of the creative). For example, creatives stored in this type of promoted format can include promoted formats of creatives that have been suggested to (and selected by) content sponsors in a content sponsor interface. In some implementations, the data store of creatives 121 can store different versions of the same creative, e.g., one in the form that is originally provided by the content sponsor 108, and one or more versions of the creative in which content has been promoted.

Other example data stores can relate to language-specific information. In some implementations, a data store of language structures and patterns 122 can store information that can be used to evaluate content for possible promotion. For example, language structures and patterns 122 can store a domain of possible end-of-line punctuation marks (e.g., a period, exclamation point, question mark, or other punctuation mark(s)). In some implementations the language structures and patterns 122 can store information that can be used to detect false positives that result from end-of-sentence punctuation marks occurring at the end of a sentence. For example, if a period is included in a creative and is part of an abbreviation (e.g., Nov., U.S., etc.), then the period may not signal an end of the sentence, and therefore promotion of the entire line may not be appropriate. In some implementations, the language structures and patterns 122 or a different data store can store information about parts of speech and n-grams.

In some implementations, a data store of restrictions 123 can store information that can identify when to restrict the promotion of content. For example, one type of restriction can relate to the length of a title, e.g., the restriction having the meaning "do not promote content if the resulting title would exceed a threshold length of N characters or occupies S horizontal space." Other example restrictions can relate to content that should not be included in the title portion (e.g., certain words, phrases, product names, etc.) and policy restrictions (e.g., policies that designate that trademark names are not to appear on the first line of a creative). In some implementations, content- and policy-related restrictions can be different for each content sponsor. Other types of restrictions can be used.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images, video and sounds, that may include embedded information (such as meta-information hyperlinks) and/or embedded instructions (such as JavaScript scripts).

A user device 106 is an electronic device that is under control of a user and is capable of requesting and receiving resources over the network 102. Example user devices 106 include personal computers (PCs), televisions with one or more processors embedded therein or coupled thereto, set-top boxes, mobile communication devices (e.g., smartphones), tablet computers and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or web page, in which content can be presented. These specified portions of the resource or user display are referred to as slots (e.g., ad slots).

To facilitate searching of these resources, the environment 100 can include a search system 112 that identifies the resources by crawling and indexing the resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 can access the cache and/or the indexed cache 114 to identify resources that are relevant to the search query 116. The search system 112 identifies the resources in the form of search results 118 and returns the search results 118 to the user devices 106 in search results pages. A search result 118 can be data generated by the search system 112 that identifies a resource that is responsive to a particular search query, and includes a link to the resource. In some implementations, the search results 118 include the content itself, such as a map, or an answer, such as in response to a query for a store's products, phone number, address or hours of operation. In some implementations, the content management system 110 can generate search results 118 using information (e.g., identified resources) received from the search system 112. An example search result 118 can include a web page title, a snippet of text or a portion of an image extracted from the web page, and the URL of the web page. Search results pages can also include one or more slots in which other content items (e.g., ads) can be presented. In some implementations, slots on search results pages or other web pages can include content slots for content items that have been provided as part of a reservation process. In a reservation process, a publisher and a content item sponsor enter into an agreement where the publisher agrees to publish a given content item (or campaign) in accordance with a schedule (e.g., provide 1000 impressions by date X) or other publication criteria. In some implementations, content items that are selected to fill the requests for content slots can be selected based, at least in part, on priorities associated with a reservation process (e.g., based on urgency to fulfill a reservation).

When a resource 105, search results 118 and/or other content items are requested by a user device 106, the content management system 110 receives a request for content. The request for content can include characteristics of the slots that are defined for the requested resource or search results page, and can be provided to the content management system 110.

For example, a reference (e.g., URL) to the resource for which the slot is defined, a size of the slot, and/or media types that are available for presentation in the slot can be provided to the content management system 110. Similarly, keywords associated with a requested resource ("resource keywords") or a search query 116 for which search results are requested can also be provided to the content management system 110 to facilitate identification of content that is relevant to the resource or search query 116.

Based at least in part on data included in the request, the content management system 110 can select content items that are eligible to be provided in response to the request ("eligible content items"). For example, eligible content items can include eligible ads having characteristics matching the characteristics of ad slots and that are identified as relevant to specified resource keywords or search queries 116. In some implementations, the selection of the eligible content items can further depend on user signals, such as demographic signals and behavioral signals.

The content management system 110 can select from the eligible content items that are to be provided for presentation in slots of a resource or search results page based at least in part on results of an auction (or by some other selection process). For example, for the eligible content items, the content management system 110 can receive offers from content sponsors 108 and allocate the slots, based at least in part on the received offers (e.g., based on the highest bidders at the conclusion of the auction or based on other criteria, such as those related to satisfying open reservations). The offers represent the amounts that the content sponsors are willing to pay for presentation (or selection) of their content with a resource. For example, an offer can specify an amount that a content sponsor is willing to pay for each 1000 impressions (i.e., presentations) of the content item, referred to as a CPM bid. Alternatively, the offer can specify an amount that the content sponsor is willing to pay (e.g., a cost per engagement) for a selection (i.e., a click-through) of the content item or a conversion following selection of the content item. For example, the selected content item can be determined based on the offers alone, or based on the offers of each content sponsor being multiplied by one or more factors, such as quality scores derived from content performance, landing page scores, and/or other factors.

A conversion can be said to occur when a user performs a particular transaction or action related to a content item provided with a resource or search results page. What constitutes a conversion may vary from case-to-case and can be determined in a variety of ways. For example, a conversion may occur when a user clicks on a content item (e.g., an ad), is referred to a web page, and consummates a purchase there before leaving that web page. A conversion can also be defined by a content provider to be any measurable or observable user action, such as downloading a white paper, navigating to at least a given depth of a website, viewing at least a certain number of web pages, spending at least a predetermined amount of time on a web site or web page, registering on a website, experiencing media, or performing a social action regarding a content item (e.g., an ad), such as republishing or sharing the content item. Other actions that constitute a conversion can also be used. For example, the user's selection of a visual URL that has been promoted to the title portion can be considered a conversion.

In some implementations, the likelihood that a conversion will occur can be improved, such as by providing a content item (e.g., an advertisement) in which selected content has been promoted to the first line (or title portion) of the content item. For example, if a complete phrase (e.g., a call to action) or a visual URL appears in the title portion, the user may be more likely to engage with the content item, and that engagement can lead to a conversion.

For situations in which the systems discussed here collect personal information about users, the users may be provided with an opportunity to opt in/out or otherwise accept privacy policies relating to the collection of such data. In addition, certain data may be anonymized in one or more ways before it is stored or used, so that personally identifiable information associated with the user is removed. For example, a user's identity may be anonymized so that the no personally identifiable information can be determined for the user, or a user's geographic location may be generalized where location information is obtained (such as to a city, ZIP code, or state level), so that a particular location of a user cannot be determined.

Figure 2A:
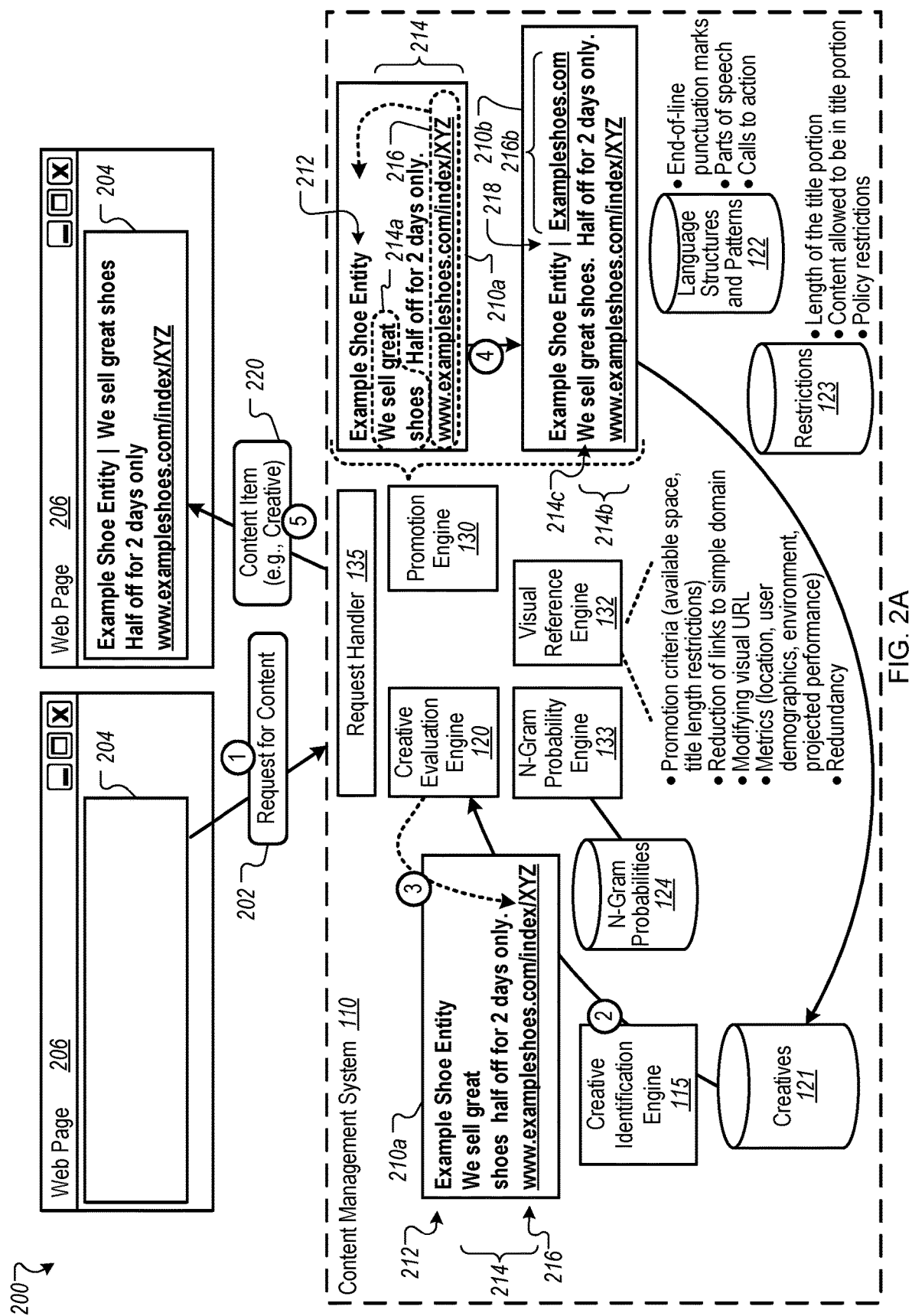
FIG. 2A shows an example system for promoting content in a creative.

FIG. 2A shows an example system 200 for promoting content in a creative. For example, the creative can be provided by the content management system 110 to the device 106, as described above with reference to FIG. 1. One example sequence of steps is now shown using the system 200. Other sequences are possible.

In some implementations, the content management system 110 can receive a request for content 202 at step 1. For example, the request for content 202 can be a request to fill a content item slot 204 (e.g., an advertisement slot on a web page 206). In another example, the request for content 202 can be a request for search results (e.g., search results 118) that are responsive to a search query (e.g., the query 116). Other forms of requests are possible, such as requests for directions, requests for a map, requests for information, etc.

In an example which does not use a request for content, a background process can execute and invoke components of the system to create or update creatives 121, e.g., including promoting a portion of content (e.g., a complete phrase and/or a visual URL) to the title portion of the creative.

At step 2, a creative 210*a* is identified for processing. For example, the creative 210*a* that is identified can be an advertisement creative that the content management system 110 identifies as associated with an eligible content item (e.g., responsive to the request for content 202) or that the content management system 110 selects in response to the request for content 202. In another example, the creative 210*a* can be a first or next creative to be processed, e.g., such as in a batch of creatives that are being updated to promote content to the title portions.

The creative 210*a* (e.g., an advertisement for an example shoe entity) can include plural portions, such as, but not limited to, a title portion 212 (e.g., "Example Shoe Entity") and a body portion 214 that includes a visual URL 216. In some implementations, the body portion 214 can include two lines of text. In this example, the body portion 214 includes the second and third lines of text within the creative 210*a*, e.g., "We sell great" and "shoes Half off for 2 days only." The visual URL 216, for example, can include a link to a website for the example shoe entity (e.g., www.exampleshoes.com) or a link to a resource or landing page associated with the example shoe entity (e.g., to an online order form).

At step 3, the creative 210*a* is evaluated for promotion. For example, the creative evaluation engine 120 can evaluate the body portion 214 to determine when the body portion 214 includes content (e.g., one or more words, a phrase or sentence) that can be added or moved to the title portion 212. In another example, the visual URL engine 132 can evaluate the visual URL 216 for possible promotion to the title portion 212.

For example, the visual URL engine 132 can determine if the visual URL satisfies one or more promotion criterion, including display criteria as described above. The visual URL engine 132 can base a decision on whether to promote the visual URL 216 on whether promotion of the visual URL 216 would violate one or more predetermined restrictions on promotion, as described above. Example restrictions, as described above, can relate to a length of the title portion 212, types of content that can be included in the title portion 212, and/or the existence of redundant content (e.g., anywhere in the creative 210a). In some implementations, the visual URL engine 132 can evaluate one or more metrics associated with the creative 210a that are related, e.g., to a geographic location of where the creative is to be served, a particular user or demographic to whom the creative is to be displayed, an environment associated with serving of the creative, and/or a relative projected performance of the creative with and without content added to the title portion 212.

In some implementations, the evaluation performed by the creative evaluation engine 120 can include determining whether text (e.g., "We sell great shoes") that is part of the body portion 214 constitutes a sentence. In some implementations, the creative evaluation engine 120 can use information from the language structures and patterns 122, e.g., that identifies a domain of possible end-of-line punctuation marks (e.g., a period, exclamation point, question mark, or other punctuation mark(s)). In some implementations, more than one punctuation mark can characterize the end of a line, such as an exclamation point (or one or more other end-of-line punctuation marks) followed by one or more single or double quotes. In some implementations, the creative evaluation engine 120 can account for spaces that appear after a non-space end-of-line punctuation mark. In some implementations, parts of speech can be used in evaluating content that may be promoted. For example, a line that ends with a preposition is not likely to be a complete phrase or sentence and therefore, by itself, may not be a good candidate for promotion.

In some implementations, the evaluation can include determining, during the evaluation of the body portion, a likelihood that the body portion includes text that constitutes a complete phrase. For example, a decision can be made to promote the text when the likelihood is above a pre-determined threshold (e.g., 95% chance that the text is a sentence). In some implementations, different thresholds can be used for creatives of different content sponsors 108.

In some implementations, the creative evaluation engine 120 may determine that the one or more words embody a call to action associated with the creative. Examples of a call to action include "Check out today's sales," "Try our great-fitting styles," "Attend our daily podcast," "Customize your environment" or other attention-grabbing phrases or sentences that request the user perform some action. In some implementations, the creative evaluation engine 120 can use a dictionary of terms, including verbs, that are likely to be imperative commands or requests used in a call to action. When detected, calls to action can be promoted into the title portion.

In some implementations, the creative evaluation engine 120 can evaluate the body portion 214, including determining when the body portion 214 includes a complete portion of text, e.g., a sentence or phrase that can span multiple lines in the body portion 214. For example, the body portion 214 may include a sequence of j words $w_1, w_2 \ldots w_j$. Associated with the j words are locations 0, 1, 2 . . . j occurring on boundaries of the words. The sequence of words in this example is "We sell great shoes," where j is 4. In this example, $w_1$ refers to "we," $w_2$ refers to "sell," $w_3$ refers to "great" and $w_4$ refers to "shoes." The locations 0-4 occur at word boundaries, including before the first word "we" (position 0) and after the fourth word "shoes" (position 4). As is the case in this example, there may be no punctuation in the sequence of words, such as a terminator after "shoes." Nevertheless, the creative evaluation engine 120 can evaluate the sequence of words, including determining a probability at each location 0-4 that a complete portion of text concludes at the given location.

In some implementations, the creative evaluation engine 120 can use probabilities associated with a likelihood that a terminator occurs at various locations among the words. For example, the probabilities can be used, among the other ways described in this document, to determine whether a complete portion of text is likely to constitute a complete phrase that can be promoted. In some implementations, when multiple different promotable complete portions of text exist in the same creative, the probabilities can be used to identify a specific complete portion of text that is most likely to constitute a complete phrase.

In some implementations, probabilities $p_1, p_2, \ldots p_n$ can be associated with N-grams of different lengths N, the terms of which overlap, or are adjacent to, a position within the sequence of words. For example, to determine if a complete phrase (e.g., "We sell great shoes") can be promoted, N-grams can be identified that are based on the position of an end-of-sentence punctuation mark (or "terminator"). In some implementations, the determination can be based on probabilities derived from a corpus of creatives having text that includes all or part of the complete phrase, e.g., using N-grams. In some implementations, the probabilities can be used to identify a probable location of the terminator within the sequence of words. In some implementations, the probabilities can be based on information evaluated from historical creatives that, for each N-gram, counts the occurrences with (and without) a terminator in a particular location. In some implementations, the creatives that are evaluated can be limited to creatives that include end-of-sentence punctuation at the end of the first line in the body portion, the second line of the body portion, or other places in the creative which are deemed to have a high confidence level of containing a complete phrase.

Example probabilities that N-grams associated with "we sell great shoes" contain a terminator at a certain position include:

$$P[\text{``we sell great shoes''},4] \qquad (1)$$

$$P[\text{``sell great shoes''},3] \qquad (2)$$

$$P[\text{``great shoes''},2] \qquad (3)$$

$$P[\text{``shoes half off''},1] \qquad (4)$$

$$P[\text{``shoes half''},1] \qquad (5)$$

$$P[\text{``half off for''},0] \qquad (6)$$

$$P[\text{``half off''},0] \qquad (7)$$

Probability (1), for example, can be understood to refer to 'the probability that a terminator occurs in position 4, or after the fourth word "shoes" in "we sell great shoes."' These example probabilities can be selected, for example, because they each represent different N-grams associated with positions in which the terminator occurs in the position after "shoes." Further, the words in each of the N-grams are included in the body portion of the creative being evaluated for promotion of content.

In some implementations, the probabilities and/or other probabilities for N-grams associated with "We sell great shoes" can be combined in a probability formula:

$$p_1 * p_2 * \ldots * p_n > (1-p_1)*(1-p_2)* \ldots *(1-p_n) \qquad (8)$$

For example, the creative evaluation engine 120 can use the probability formula (8) to determine, in addition to other criteria described in this document, whether "We sell great shoes" represents a promotable content item (e.g., is a complete phrase or sentence or is likely to be a complete phrase or sentence based on individual probabilities associated with N-grams). In this example, $p_1$ can be associated with probability (1), $p_2$ can be associated with probability (2), and so on, including any other probabilities associated with the existence (or nonexistence) of a terminator after "shoes." Other formulas can be used.

In some implementations, the probability formula (8) or other formulas can include additional terms that can smooth out or normalize the computed products of the probabilities. For example, the probability formula (8) can also include a $p_0$ term, e.g., set at a default value, that can be used on either or both sides of the formula (e.g., as $1-p_0$ on the right side). In some implementations, the inclusion of these and other additional terms can offset fluctuations in, or dominance by, other terms. In some implementations, the inclusion of additional terms can prevent the evaluation of probability formulas from resulting in zero or dividing by zero.

In some implementations, when evaluating the body portion 214 to determine the content (e.g., one or more words) that can be promoted, the creative evaluation engine 120 can determine whether the promotion would violate one or more predetermined restrictions (e.g., restrictions 123). For example, the creative evaluation engine 120 can make a determination not to promote the one or more words when they are on a predetermined restriction list or blacklist.

Another example restriction can be related to the length of the title portion 212. For example, if the combined length of the existing title portion 212 ("Example Shoe Entity") and the visual URL to be promoted would exceed the horizontal space available in the content item slot 204, then the creative evaluation engine 120 can decide not to promote or modify proposed promotion content. In another example, if the combined length of the existing title portion 212 and the one or more words to be promoted (e.g., "We sell great shoes") would exceed the horizontal space available in the content item slot 204, then the creative evaluation engine 120 can decide not to promote. In some implementations, a threshold size that the creative evaluation engine 120 uses to decide whether or not to promote can be based on the number of characters in the title portion 212 that would result once the candidate promoted content (e.g., one or more words) is promoted. In some implementations, the restriction-based decisions based on the length of the title portion 212 can account for any characters (e.g., spaces, vertical lines, or delimiters) that are to be inserted between the original title portion 212 and the content to be promoted.

Other example restrictions used by the creative evaluation engine 120 can relate to the type of content that should not be included in the title portion 212 (e.g., certain words or phrases) and policy restrictions (e.g., a policy that designates that trademark names are not to appear on the first line of a creative). For example, the creative evaluation engine 120 can evaluate text at the beginning, middle, or anywhere within the body portion of the creative to identify one or more words that may violate a restriction. In some implementations, each content sponsor 108 can specify content- and policy-related restrictions that are unique to that content sponsor 108. For example, the "Example Shoe Entity" may have a policy (e.g., identified in an advertising campaign by the content sponsor 108) to avoid the promotion of particular trademark terms into the first line of the creative. In another example, a different entity may have no restrictions on trademark terms, but may have restrictions based on the specific content or type of content that should not be promoted.

In some implementations, information used by the creative evaluation engine 120 and/or the visual URL engine 132 to decide among multiple kinds of promotion can be learned over time, e.g., based on metrics for user engagements with content, such as clicks. For example, the metrics may identify the scenarios in which it is more advantageous to promote the visual URL versus the second line of the creative versus doing nothing at all. Other criteria can be used to decide which content is to be promoted.

At step 4, when it is determined that content can be promoted, then the promotion engine 130, for example, can promote the content. For example, the promoted content can include the visual URL 216 that is determined to be promotable by the visual URL engine 132 or a complete phrase identified by the creative evaluation engine 120. In this example, the result of the promotion is the creative 210b. Specifically, the title portion 212 is modified to include a modified visual URL 216b, e.g., "Exampleshoes.com" shortened from "www.exampleshoes.com/index/XYZ" in the visual URL 216. In another example (not shown in FIG. 2A), the complete phrase 214a can be promoted to the title portion 212. As a result of the promotion in the current example, the creative 210b includes three lines, where the original title portion 212 and the modified visual URL 216b have been combined, with a delimiter 218 separating the two portions. While the modified visual URL 216b in this example is capitalized, other ways of emphasizing/differentiating the visual URLs can be used, including, e.g., using all lowercase characters (e.g., "exampleshoes.com") or capitalizing individual words (e.g., "ExampleShoes.com").

In some implementations, when a complete phrase is promoted, a delimiter (e.g., a period or exclamation point) can be added to the promoted content, such as to indicate the end of the sentence. In some implementations, when the evaluation of the creative includes an analysis based on parts of speech and indicates that the promoted complete phrase 214a is likely to be a question (e.g., "want great shoes" or "do you want great shoes"), then the delimiter can be a question mark. In some implementations, content can be promoted so as to combine lines of text. For example, a new first line 214c of a modified body portion 214b in the creative 210b can combine the first two lines (e.g., "We sell great" and "shoes Half off for 2 days only") of the body portion 214 of the creative 210a. This example creative 210a shows promotion of two types of content: the modified visual URL 216b and the promotion of "shoes Half off for 2 days only" to the new first line 214c of the modified body portion 214b.

At step 5, the creative 210b is provided, including the title portion 212, e.g. with the promoted content. In the example using the request for content 202 to fill the content item slot 204, step 5 can occur, for example, when the content management system 110 provides a content item 220 (e.g., the creative 210b) in response to the request for content 202. If for some reason no promotion occurred, e.g., when the creative evaluation engine 120 and/or the visual URL engine failed to identify content to promote, then the content item 220 provided by the content management system 110 can be the original (e.g., four-line) creative 210a. Providing the creative 210b can include presenting it to the user along with responsive results or providing the creative to a content sponsor for approval.

In some implementations, instead of (or in addition to) providing the creative in response to a request for content, the creative can be stored. For example, storing the creative with content promoted to the title portion can be part of a background or batch process that updates several creatives at once. In some implementations, once a modified creative is provided in response to a single request for content, then the creative can be stored, e.g., for a subsequent similar requests for content from other users. In some implementations, storing the creative (or providing the creative in response to a request for content) can include providing estimated performance information for the creative. For example, the estimated performance information can include metrics that identify and compare the performance of the creative with and without promotion. In some implementations, the estimated performance information for the creative can include providing a relative performance change projection, e.g., a numerical projection that indicates that the creative is likely to perform better (e.g., by a certain percentage) with content promoted to the title portion than without promotion.

Figure 2B:
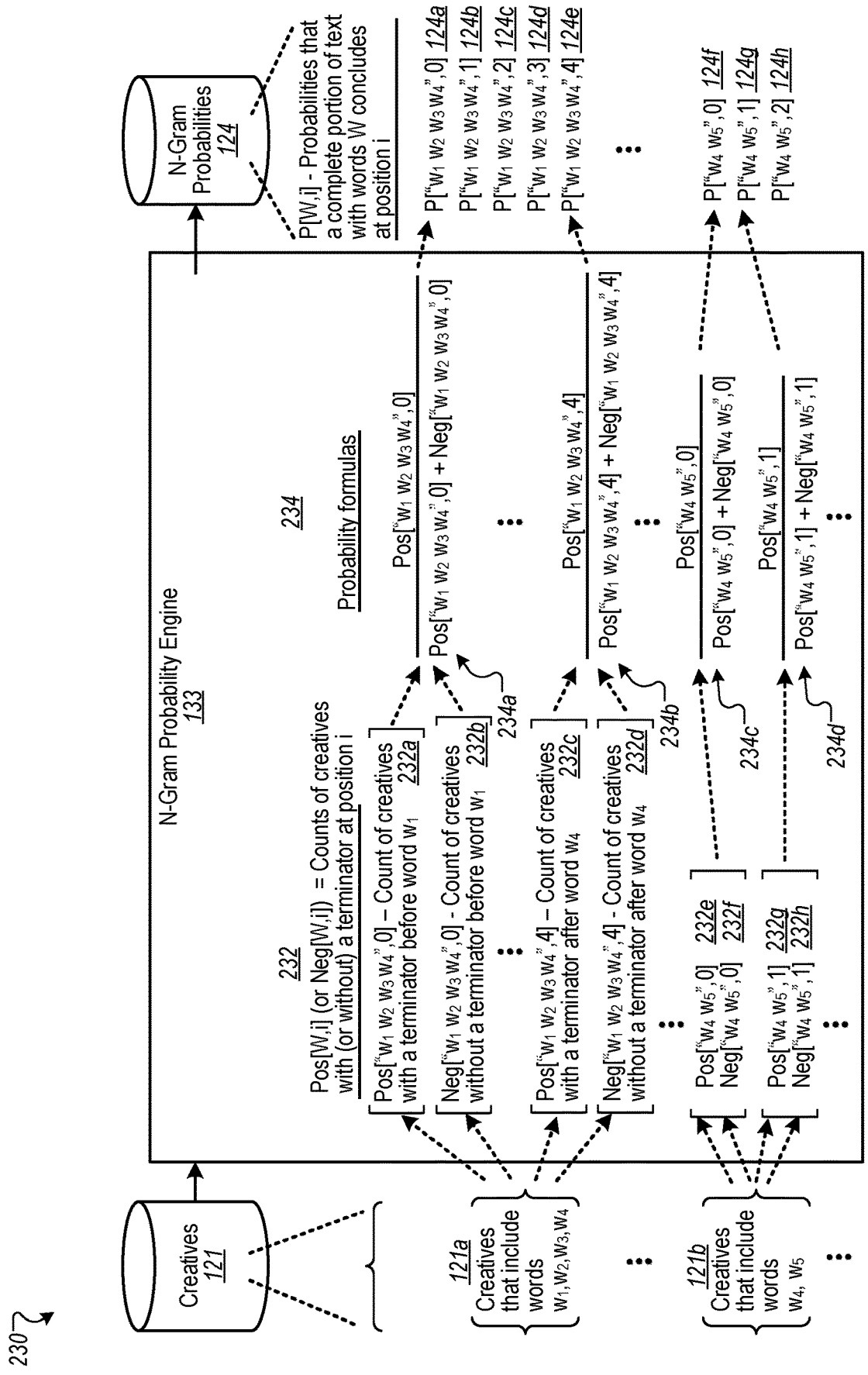
FIG. 2B is a block diagram of a system for pre-evaluating a historical database of creatives to determine probabilities that portions of text conclude at a given location.

FIG. 2B is a block diagram of a system 230 for pre-evaluating a historical database of creatives 121 to determine probabilities that portions of text conclude at a given location. For example, the probabilities can be N-gram probabilities 124 that are stored and used later to evaluate creatives to determine complete portions of text that can be promoted, e.g., as described above with reference to in FIG. 2A. In some implementations, the N-gram probability engine 133 can perform the pre-evaluation periodically (e.g., weekly or monthly) or as new creatives 121 are available.

In some implementations, N-grams (e.g., sequential groups of N words) can be used to determine the N-gram probabilities 124, where N can be 1 or greater. For example, the N-gram probability engine 133 can evaluate 1-grams, 2-grams, 3-grams and so on from the text of each of the creatives 121. For each N-gram evaluated from the creatives, the N-gram probability engine 133 can record whether or not an end-of-sentence punctuation mark (or a "terminator" such as a period, question mark, exclamation point, etc.) occurs just before the N-gram, between any of the words, or at the end of the N-gram. For example, for any N-gram, there can be N+ locations in which a terminator exists. In some implementations, these positions can be represented by numbered positions zero (just before the first word), 1 through N−1 (after words 1 through N−1), and N (after the last word).

As an example, consider processing that can occur for the 4-gram "we sell great shoes" that includes the words represented by terms $w_1$, $w_2$, $w_3$, $w_4$ (e.g., the words "we," "sell," "great" and "shoes") sequentially and in that order. Creatives 121a, for example, may include thousands of advertisements that contain "we sell great shoes" somewhere in the text of the advertisement. In some implementations, the N-gram probability engine 133 can parse the text of the creatives 121 to evaluate N-grams. As a result, the N-gram probability engine 133 can determine counts 232 of occurrences in creatives 121 that have (or do not have) terminators at positions 0 to N. For example, Pos[W,i] can represent a count of creatives (e.g., 27,000) with a period at position i in a sequence of words W. Alternatively, Neg[W,i] can represent a count of creatives (e.g., 3,000) without a terminator at position i. In the current example, the sequence of words W includes $w_1$, $w_2$, $w_3$, $w_4$ or "we sell great shoes." Counts 232a and 232b, for example, represent the number of creatives 121a with and without terminators, respectively, at position zero. Counts 232c and 232d, for example, represent the number of creatives 121a with and without terminators, respectively, at position 4.

In some implementations, the creatives 121a may include any occurrences of "we sell great shoes" that may or may not have interspersed punctuation. For example, a creative that includes "we sell great shoes" would be considered to qualify for inclusion in the creatives 121a, and so would a creative that includes "shoes that we sell. Great shoes at great prices!" However, creatives 121 that include "selling great shoes" or just "we sell" would not be included in the creatives 121a (unless they also include qualifying phrases). In some implementations, restrictions can be applied to count only exact occurrences of sequences as opposed to just occurrences where all the words are present, just not in the desired order.

In another example, consider the 2-gram "shoes half" for which creatives 121b are identified as including that 2-gram. In this example, $w_4$ is used to refer to "shoes" and $w_5$ is used to refer to "half." Counts 232e and 232f represent the number of creatives 121b with and without, respectively, terminators at position zero. Counts 232g and 232h represent the number of creatives 121b with and without, respectively, terminators at position one. In this example, $w_4$ is chosen as the term to represent "shoes" in order to match the $w_4$ term "shoes" in the $w_1$, $w_2$, $w_3$, $w_4$ in the "we sell great shoes" example.

In some implementations, the N-gram probability engine 133 can evaluate creatives 121 for N-grams up to a threshold value of N. For example, if N is 10, there may be very few creatives that each contains the same 10-word phrase. In some implementations, the N-gram probability engine 133 can evaluate creatives for increasing values of N until, for example, statistically small (e.g., less than 1000) Pos and Neg counts occur.

In some implementations, probability formulas 234 can be used that are functions of Pos and Neg counts. One example probability that a terminator is located at position 0 in the word sequence $w_1$, $w_2$, $w_3$, $w_4$, can be represented by:

$$P[``w_1\ w_2\ w_3\ w_4", 0] = \frac{Pos[``w_1\ w_2\ w_3\ w_4", 0]}{Pos[``w_1\ w_2\ w_3\ w_4", 0] + Neg[``w_1\ w_2\ w_3\ w_4", 0]} \quad (9)$$

For example, the preceding formula is a probability formula 234a that includes terms from counts 232a and 232b. Specifically, the probability formula 234a shows that the probability for a terminator existing at the given location zero is equal to the number of positive occurrences (e.g., P["$w_1$ $w_2$ $w_3$ $w_4$",0]) divided by a sum of the number of positive occurrences and the number of negative occurrences (e.g., Neg["$w_1$ $w_2$ $w_3$ $w_4$",0]). In some implementations, the probability formula 234a can be represented by the N-gram probability 124a (e.g., P["$w_1$ $w_2$ $w_3$ $w_4$",0], or P["we sell great shoes",0). Similarly, probability formula 234b uses the terms from counts 232c and 232d associated with the terminator being located in the fourth position (e.g., after $w_4$, or "shoes" in the phrase "we sell great shoes").

In some implementations, counts such as the counts 232a and 232b that represent the number of positive and negative occurrences, respectively, can be multiplied by a fixed scalar greater than 1 (e.g., 20) before they are used in probability formulas such as probability formula 234a. For example, this can result in smoothing the effect of large or small values in any of the terms in the formulas.

In some implementations, probabilities are not calculated or stored unless the sum of the positive and negative occurrences exceeds a threshold value (e.g., 2,000). For example, if counts 232a and 232b total less than 2,000, then the probability formula 234a is not evaluated or results stored. Using a threshold can increase a confidence level in the probabilities that are calculated.

In some implementations, a scalar (e.g., 1) can be added to terms in the probability formula (9). For example, the probability for a terminator occurring at the given location zero in "$w_1\ w_2\ w_3\ w_4$" can be given by:

$$P["w_1\ w_2\ w_3\ w_4", 0] = \frac{1 + Pos["w_1\ w_2\ w_3\ w_4", 0]}{(1 + Pos["w_1\ w_2\ w_3\ w_4", 0]) + (1 + Neg["w_1\ w_2\ w_3\ w_4", 0])} \quad (10)$$

In some implementations, the inclusion of a scalar to formula (10) or to other formulas can account for situations in which sparse data exists, e.g., low Pos and/or Neg counts of words. For example, the scalar can smooth the results of the calculations. In some implementations, the scalar can automatically discount itself when the counts are high, but when counts are low, the scalar can dominate the equation.

Figure 3A:
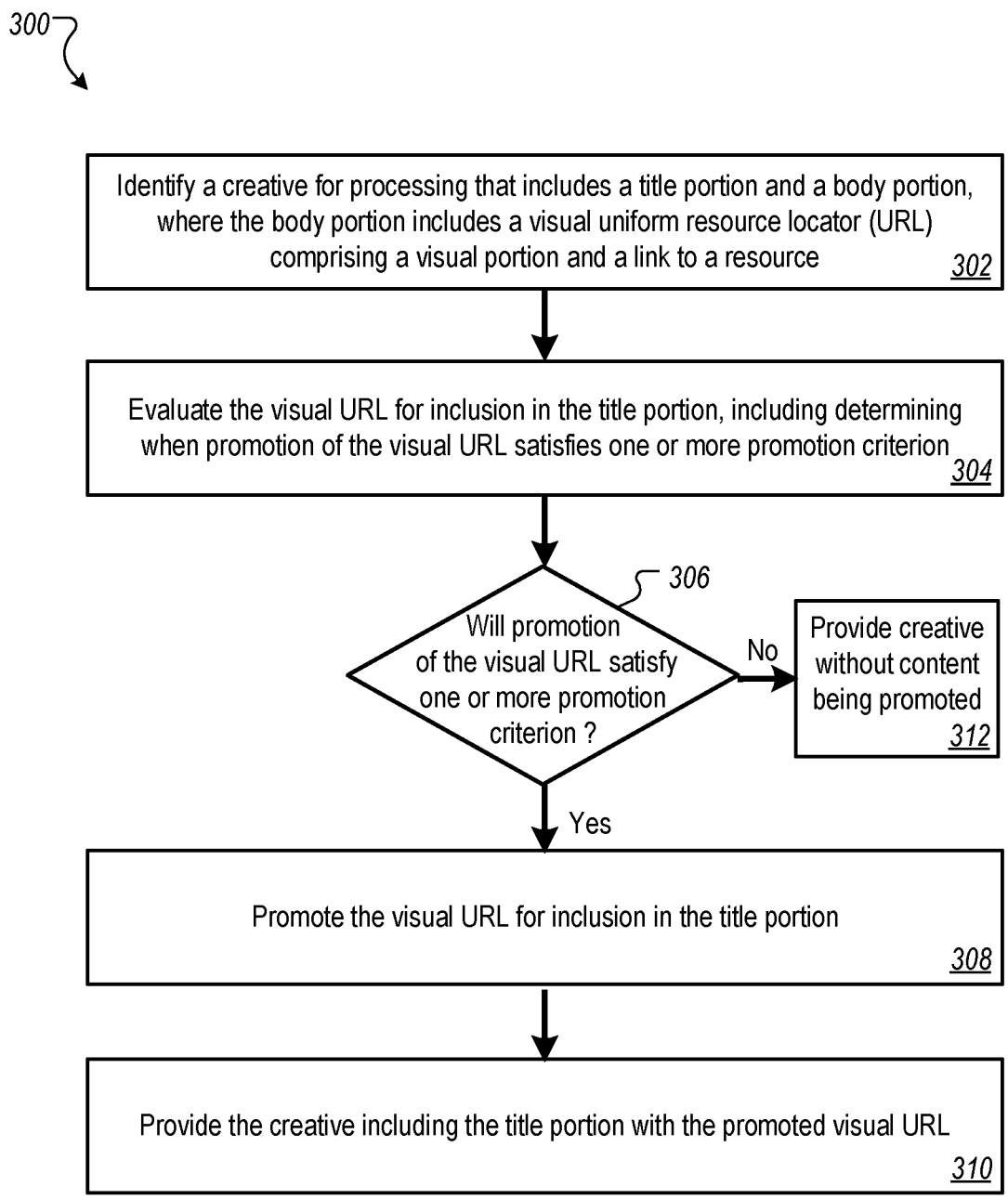
FIG. 3A is a flowchart of an example process for promoting a visual URL in a creative.

FIG. 3A is a flowchart of an example process 300 for promoting a visual URL in a creative. In some implementations, the content management system 110 and/or its subordinate components can perform steps of the process 300 using instructions that are executed by one or more processors. FIGS. 1-2B are used to provide example structures for performing the steps of the process 300. In some implementations, the process 300 can be initiated, for example, when the content management system 110 receives the request for content 202, as described above with respect to FIG. 2A.

A creative is identified for processing, the creative including a title portion and a body portion, where the body portion includes a visual uniform resource locator (URL) that comprises a visual portion and a link to a resource (302). The content management system 110, for example, can identify the creative 210a, e.g., a creative associated with an advertisement for shoes. The creative 210a includes the title portion 212 and the body portion 214 that includes the visual URL 216 in addition to text. The visual portion is what the user sees (e.g., "www.exampleshoes.com/index/XYZ") when an impression of the creative occurs. A link portion, for example, which may or may not include the same path as the associated visual portion, is a link to a corresponding resource, e.g., the URL to which the user is directed upon selection of the visual portion.

In some implementations, identification of the creative 210a can occur subsequent to receipt by the content management system 110 of a request for content (e.g., the request for content 202 that is related to shoes). For example, the creative 210a that is identified by the content management system 110 can be associated with an eligible content item or a selected content item (e.g., an advertisement for shoes) that is responsive to the request for content 202. In this example, the creative includes the title portion 212 (e.g., "Example Shoe Entity"), two lines of text in the body portion 214 (e.g., "We sell great" and "shoes Half off for 2 days only"), and a visual URL 216 (e.g., www.exampleshoes.com).

The visual URL is evaluated for inclusion in the title portion, including determining if promotion of the visual URL would satisfy one or more promotion criterion (304). For example, the visual URL engine 132 can determine if the visual URL 216 satisfies one or more promotion criterion, as described above. In some implementations, a decision to promote a visual URL may occur after evaluation of other content for promotion. In some implementations, content from the body portion may be promoted to the title portion prior to the promotion of the visual URL.

If promotion of the visual URL would satisfy one or more promotion criterion (306), then the visual URL is promoted for inclusion in the title portion (308), and the creative is provided including the title portion with the promoted visual URL (310). For example, the promotion engine 130 can promote the visual URL 216 to the title portion 212. In the example described above, the modified visual URL 216b is promoted to the title portion 212.

In some implementations, promotion can include adding a delimiter to the title portion between text of the title portion and the promoted content. For example, the creative 210b includes the delimiter 218 that separates the original title portion 212 (e.g., "Example Shoe Entity") from the modified visual URL 216b.

In some implementations, when a visual URL is promoted to the first line, the act of promotion can include constructing a link for the title portion after promotion. For example, the link that is constructed can be the same or a shortened version of a link to the resource (e.g., a URL) corresponding to the modified visual URL 216. In some implementations, the link that is constructed in the title portion during promotion can be directed to a first resource (e.g., www.exampleshoes.com), and the visual URL can be directed to a second different resource (e.g., www.exampleshoes.com/index/XYZ). For example, it may be determined that users are more likely to click on the shortened URL. In some implementations, the link that is constructed is anchor text for the resource set forth in the visual URL.

The content management system 110 can then provide the creative 210b containing the promoted content. For example, the creative 210b can be the content item 220 that the content management system 110 provides in response to the request for content 202.

Otherwise, if promotion of the visual URL would not satisfy one or more promotion criterion, then the creative is provided without content being promoted (312). For example, if no promotion of the visual URL 216 (or any other content) occurs, then the creative 210a (e.g., with un-promoted content) can be the content item 220 that the content management system 110 provides in response to the request for content 202.

FIG. 3B is a flowchart of an example process 320 for determining whether to promote a complete phrase or a visual URL in a creative. In some implementations, the content management system 110 and/or its subordinate components can perform steps of the process 320 using instructions that are executed by one or more processors. FIGS. 1-2B are used to provide example structures for performing the steps of the process 320.

A creative is identified for processing that includes a title portion and a body portion, where the body portion includes a visual uniform resource locator (URL) that has a visual portion and includes a link to a resource (322). The content management system 110, for example, can identify the creative 210a, e.g., a creative associated with an advertisement for shoes. The creative 210a includes the title portion 212 and the body portion 214 that includes the visual URL 216 in addition to text. The text, for example, may contain a complete phrase that may be determined to be promotable to the title portion 212. In some implementations, before making a determination of whether to promote a visual URL, the body portion is first evaluated to determine whether there is a complete phrase that can be promoted.

The body portion is evaluated including determining when a textual portion of the body portion includes a complete phrase, the evaluating including applying a test to one or more words in the body portion (324). For example, the creative evaluation engine 120 can evaluate the body portion 214 to determine if "We sell great shoes" constitutes a sentence. In some implementations, the determination can be made, e.g., based on using probabilities associated with N-grams that correspond to words in the body portion of the creative. For example, one or more probabilities associated with each word can serve as a test to determine the likelihood that a sentence ends at that word.

In some implementations, the creative evaluation engine 120 can use the probability formula (8) (e.g., $p_1 * p_2 * \ldots * p_n > (1-p_1) * (1-p_2) * \ldots * (1-p_n)$) to determine, in addition to other criteria described in this document, whether "We sell great shoes" represents a promotable content item, as described above. In some implementations, the creative evaluation engine 120 can determine whether "We sell great shoes" is likely to be a complete phrase or sentence, e.g., based on individual probabilities associated with N-grams. As described above, $p_1$ can be associated with probability (1), $p_2$ can be associated with probability (2), and so on, including any other probabilities associated with the existence (or nonexistence) of a terminator after "shoes." Other formulas can be used.

In some implementations, the creative evaluation engine 120 can determine whether promotion should occur, e.g., by evaluating one or more metrics associated with the creative or delivery of the creative. For example, one metric can relate to a location of where the creative is to be served, e.g., the country in which the user currently resides. In some implementations, the user's location can be determined using global positioning system (GPS) capabilities of the user's mobile device, by location information provided by the user (e.g., an address provided by the user in a user profile), or in other ways. In some implementations, content sponsors can specify that promotion of content in their content items is not to occur in certain countries or in other situations specified by the content sponsor.

In some implementations, another metric can relate to a user to whom the creative is to be displayed. For example, promotion may not occur if the language of the user is Chinese, Japanese or Korean or some other language, e.g., for which it has been determined that promotion of content to the title portion does not result in better performance (e.g., increased click-throughs, etc.).

Some implementations can use a metric that relates to an environment associated with the serving of the creative. For example, for non-mobile devices (e.g., home personal computers), it may be been determined that users prefer that promotion does not occur. However, users of mobile devices may generally prefer that promotion does occur. In some implementations, the decision to promote or not promote based on environment can be based, at least in part, on statistics derived from historical user engagements for content that is provided with and without promoted content.

Some implementations can include metrics that relate to the creative's performance, e.g., on a creative-by-creative basis. For example, performance-related metrics can indicate a relative projected or predicted performance of the creative with and without content added to the title portion. In some implementations, if it is determined that promoting the content is likely to cause the creative to perform at least slightly better than the creative without promoting, then promotion can occur.

Some or all of these considerations can be used to determine whether the body portion includes a textual portion that constitutes a complete phrase. If the textual portion of the body portion includes a complete phrase (326), then the complete phrase is promoted into the title portion (328). For example, the promotion engine 130 can promote the complete phrase 214a to the title portion 212. As a result, the title portion 212 can become "Example Shoe Entity|We sell great shoes."

Otherwise (e.g., when a complete phrase is not located or not determined to be promotable), or thereafter, the visual URL is evaluated for inclusion in the title portion, including determining if promotion of the visual URL satisfies one or more promotion criterion (330). In some implementations, the visual URL engine 132 can evaluate the visual URL 216 for possible promotion to the title portion 212. For example, the visual URL engine 132 can determine if the visual URL 216 satisfies one or more promotion criterion, including display criteria as described above. In some implementations, the visual URL engine 132 can base a decision on whether to promote the visual URL 216 on whether promotion of the visual URL 216 would violate one or more predetermined restrictions on promotion. Example restrictions, as described above, can relate to a length of the title portion 212, types of content that can be included in the title portion 212, and/or the existence of redundant content (e.g., anywhere in the creative 210a). In some implementations, the visual URL engine 132 can evaluate one or more metrics associated with the creative 210a that are related, e.g., to a geographic location of where the creative is to be served, a particular user or demographic to whom the creative is to be displayed, an environment associated with the serving of the creative, and/or a relative projected performance of the creative with and without content added to the title portion 212.

If the visual URL satisfies one or more promotion criterion (332), then the visual URL is promoted for inclusion in the title portion (334). In the example shown in FIG. 2A, the modified visual URL 216b has been promoted to the title portion 212 in the creative 210a. For example, before promotion, the reference to the World Wide Web (e.g., the "www" portion) has been removed, and the URL has been truncated to remove all but the domain information (e.g., removing "/index/XYZ").

The creative is provided, including the title portion with the promoted complete phrase and/or visual URL (336). For example, if the complete phrase 214a was promoted, then the content management system 110 can then provide the creative 210b containing the promoted complete phrase. If the visual URL 216 (or the modified visual URL 216b) was promoted, then the content management system 110 can then provide the creative 210b containing the promoted visual URL 216. In either example, the creative 210b can be the content item 220 that the content management system 110 provides in response to the request for content 202, e.g., to fill the content item slot 204.

Figure 4:
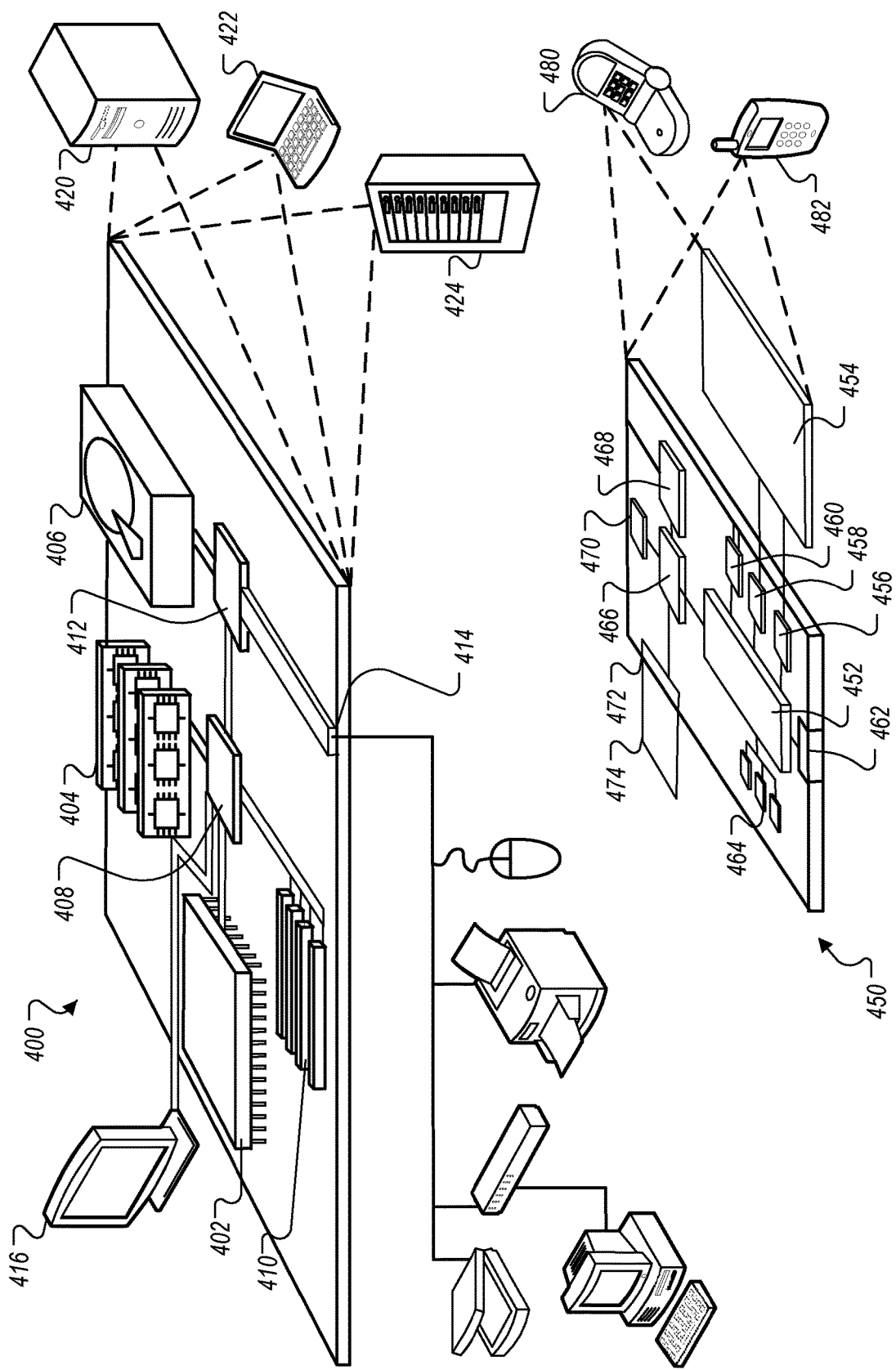
FIG. 4 is a block diagram of an example computer system that can be used to implement the methods, systems and processes described in this disclosure.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 400 is further intended to represent any other typically non-mobile devices, such as televisions or other electronic devices with one or more processers embedded therein or attached thereto. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402. The computer-readable medium does not include a transitory signal.

The high speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a subscriber identification module (SIM) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer implemented method, comprising:
identifying, using one or more processors, content of a creative for processing, the content of the creative including a title portion and additional textual content;
automatically, by the one or more processors and before serving the creative in response to a received request, evaluating the textual content;
dynamically creating, by the one or more processors, a modified content item from the creative in response to the evaluating revealing that the textual content includes a complete phrase, including adding the complete phrase to the title portion of the content item for presentation in the title portion with original text of the title portion;
providing, by the one or more processors, the modified creative for presentation in a content item slot and in response to the received request.

2. The method of claim 1, wherein automatically evaluating the textual content comprises determining whether one or more words are followed by a terminator.

3. The method of claim 2, wherein dynamically creating the modified content item comprises including the one or more words in the title portion when the one or more words are followed by a terminator.

4. The method of claim 2, wherein dynamically creating the modified content item comprises including the one or more words in the title portion when the one or more words are not followed by a terminator.

5. The method of claim 1, wherein automatically evaluating the textual content comprises determining, for each of multiple different N-grams of different length in the textual content, a probability of the N-gram constituting a complete phrase, wherein the method further comprises determining that the evaluation reveals that at least one of the N-grams constitutes a complete phrase.

6. The method of claim 1, wherein dynamically creating a modified content item further includes inserting a delimiter between the original text of the title portion and the complete phrase that is added to the title portion.

7. The method of claim 1, further comprising selecting the complete phrase from among a group of complete phrases based on a promotion restriction, including selecting the complete phrase from among the group based on a total length of the title portion following the addition of the complete phrase being within a length of title restriction corresponding to an amount of space available to present the title.

8. A non-transitory computer-readable medium storing instructions, that when executed, cause one or more processors to perform operations including:
identifying content of a creative for processing, the content of the creative including a title portion and additional textual content;
automatically evaluating the textual content before serving the creative in response to a received request;
dynamically creating a modified content item from the creative in response to the evaluating revealing that the textual content includes a complete phrase, including adding the complete phrase to the title portion of the content item for presentation in the title portion with original text of the title portion;
providing the modified creative for presentation in a content item slot and in response to the received request.

9. The non-transitory computer-readable medium of claim 8, wherein automatically evaluating the textual content comprises determining whether one or more words are followed by a terminator.

10. The non-transitory computer-readable medium of claim 9, wherein dynamically creating the modified content item comprises including the one or more words in the title portion when the one or more words are followed by a terminator.

11. The non-transitory computer-readable medium of claim 9, wherein dynamically creating the modified content item comprises including the one or more words in the title portion when the one or more words are not followed by a terminator.

12. The non-transitory computer-readable medium of claim 8, wherein automatically evaluating the textual content comprises determining, for each of multiple different N-grams of different length in the textual content, a probability of the N-gram constituting a complete phrase, wherein the operations cause the one or more processors to perform operations further comprising determining that the evaluation reveals that at least one of the N-grams constitutes a complete phrase.

13. The non-transitory computer-readable medium of claim 8, wherein dynamically creating a modified content item further includes inserting a delimiter between the original text of the title portion and the complete phrase that is added to the title portion.

14. The non-transitory computer-readable medium of claim 8, wherein the instructions cause the one or more processors to perform operations further comprising selecting the complete phrase from among a group of complete phrases based on a promotion restriction, including selecting the complete phrase from among the group based on a total length of the title portion following the addition of the complete phrase being within a length of title restriction corresponding to an amount of space available to present the title.

15. A system comprising:
one or more processors; and
one or more memory devices storing instructions that, when executed, cause the one or more processors to perform operations including:
identifying content of a creative for processing, the content of the creative including a title portion and additional textual content;
automatically evaluating the textual content before serving the creative in response to a received request;
dynamically creating a modified content item from the creative in response to the evaluating revealing that the textual content includes a complete phrase, including adding the complete phrase to the title portion of the content item for presentation in the title portion with original text of the title portion;
providing the modified creative for presentation in a content item slot and in response to the received request.

16. The system of claim 15, wherein automatically evaluating the textual content comprises determining whether one or more words are followed by a terminator.

17. The system of claim 16, wherein dynamically creating the modified content item comprises including the one or more words in the title portion when the one or more words are followed by a terminator.

18. The system of claim 16, wherein dynamically creating the modified content item comprises including the one or more words in the title portion when the one or more words are not followed by a terminator.

19. The system of claim 15, wherein automatically evaluating the textual content comprises determining, for each of multiple different N-grams of different length in the textual content, a probability of the N-gram constituting a complete phrase, wherein the instructions cause the one or more processors to perform operations further comprising determining that the evaluation reveals that at least one of the N-grams constitutes a complete phrase.

20. The system of claim 15, wherein the instructions cause the one or more processors to perform operations further comprising selecting the complete phrase from among a group of complete phrases based on a promotion restriction, including selecting the complete phrase from among the group based on a total length of the title portion following the addition of the complete phrase being within a length of title restriction corresponding to an amount of space available to present the title.

* * * * *